United States Patent [19]

Nakata et al.

[11] Patent Number: 5,506,765

[45] Date of Patent: Apr. 9, 1996

[54] CONTROL APPARATUS OF POWER CONVERTER AND CONTROL APPARATUS OF ELECTRIC MOTOR VEHICLE

[75] Inventors: Kiyoshi Nakata, Iwase; Tokunosuke Tanamachi, Katsuta; Mutsuhiro Terunuma, Mito; Masato Suzuki, Urizura; Kiyoshi Nakamura, Katsuta; Eiichi Toyota, Katsuta; Syuuji Saitou, Katsuta; Takayuki Matsui, Hitachi, all of Japan

[73] Assignee: Hitachi, Ltd., Tokyo, Japan

[21] Appl. No.: 51,323

[22] Filed: Apr. 23, 1993

[30] Foreign Application Priority Data

Apr. 23, 1992 [JP] Japan ................... 2-104260

[51] Int. Cl.$^6$ ............................................. H02M 7/5387
[52] U.S. Cl. ............................................. 363/98; 363/132
[58] Field of Search ................... 363/17, 28, 41, 363/96, 98, 132, 136, 137

[56] References Cited

U.S. PATENT DOCUMENTS

| | | | |
|---|---|---|---|
| 4,270,163 | 5/1981 | Baker | 363/132 |
| 4,443,384 | 4/1984 | Mikami et al. | 363/41 |
| 4,855,893 | 8/1989 | Kratz | 363/136 |
| 4,881,159 | 11/1989 | Holtz et al. | 363/137 |
| 4,953,069 | 8/1990 | Braun et al. | 363/41 |
| 5,060,129 | 10/1991 | Maruyama | 363/98 |
| 5,155,675 | 10/1992 | Maruyama et al. | 363/98 |
| 5,274,542 | 12/1993 | Tanaka et al. | 363/96 |
| 5,321,599 | 6/1994 | Tanamachi et al. | 363/41 |
| 5,355,297 | 10/1994 | Kawabata et al. | 363/132 |
| 5,361,196 | 11/1994 | Tanamachi et al. | 363/132 |

OTHER PUBLICATIONS

Velaerts et al.; "A Novel Approach to the Generation and Optimization of Three–Level PWM Waveforms"; Apr. 1988 IEEE pp. 1255–1262.

Bhagwat, et al., "Generalized Structure of a Multilevel PWM Inverter," IEEE Transactions on Industry Applications, vol. 1A–19, No. 6, Nov./Dec., 1983, pp. 1057–1069.

Oguchi, et al., "An Improved Three–Phase Multistepped–Voltage Inverter Combined with a Single–Phase Inverter Through Switching Devices," IEEE Transactions on Industry Applications, vol. 1A–20, No. 3, May/Jun., 1984, pp. 656–666.

Primary Examiner—Jeffrey L. Sterrett
Attorney, Agent, or Firm—Antonelli, Terry, Stout & Kraus

[57] ABSTRACT

Disclosed is an apparatus for realizing a small apparatus by making element currents uniform in the dipolar modulation mode. The zero voltage period in the dipolar modulation period is made shorter than other voltage output periods. Accordingly, currents of switching elements constituting the main circuit of an inverter can be made uniform.

21 Claims, 9 Drawing Sheets

CONTROL APPARATUS OF POWER CONVERTER AND CONTROL APPARATUS OF ELECTRIC MOTOR VEHICLE

BACKGROUND OF THE INVENTION

1. Field of the Invention

The present invention relates to a control unit of a power converter for converting a direct current to an AC-phase voltage having at least 3 electric potentials and more particularly to improvement of switching control of elements constituting the power converter.

2. Prior Art

A dipolar modulation method for outputting positive and negative pulse voltages alternately via zero voltage as wave form improvement of a three-level inverter has been proposed in "A Novel approach to the Generation and Optimization of Three-level PWM Wave Forms", pp. 1255 to 1262. The paper describes that the output wave form can be improved by modifying the relationship between bias and amplitude of a modulation wave as predetermined.

When dipolar modulation is performed on the basis of the relationship described in the above prior art, it is found that the DC side elements (two switching elements connected to the DC power source) and AC side elements (two switching elements connected to the AC output terminal) are not uniform in the loss generated in the switching elements. The heat generation distribution of the DC side elements and AC side elements is not uniform due to this lack of uniformity, and the element cooling system is required to be designed according to the elements with a large calorific value, and the inverter system becomes large.

SUMMARY OF THE INVENTION

An object of the present invention is to miniaturize a three-level inverter system having a dipolar modulation means.

Another object of the present invention is to provide a control apparatus for equalizing the heat generation distribution generated in switching elements constituting the main circuit of a three-level inverter having a dipolar modulation means.

A further object of the present invention is to provide a control apparatus of an electric motor vehicle including a three-level inverter having a dipolar modulation means which can spread the operating range.

To accomplish the above objects, in a control apparatus of a power converter including a power converter for converting a direct current to an AC-phase voltage having a high potential, intermediate potential, and low potential by selective switching by a switching means and a modulation means for representing the half cycle of the AC output phase voltage of this power converter by outputting the high potential and low potential alternately via the intermediate potential, the difference between the mean current of currents flowing through a switching means for outputting the above intermediate potential and the mean current of currents flowing through a switching means connected to the high potential or low potential of the above direct current is lower than the mean current of currents flowing through the switching means connected to the high potential or low potential of the above direct current.

To accomplish the above objects, a control apparatus of a power converter including a modulation means for converting a direct current to an AC-phase voltage having at least three potentials such as a high potential, intermediate potential, and low potential and for representing the half cycle of the AC output phase voltage by outputting the high potential and low potential alternately via the intermediate potential has a means for making the total of pulse widths of the high potential and low potential larger than the total of output periods of the intermediate potential included in the half cycle of the AC output phase voltage.

To accomplish the above objects, a control apparatus of an electric motor vehicle including a modulation means for representing the half cycle of the AC output phase voltage by outputting the high potential and low potential alternately via the intermediate potential, a power converter for converting a direct current to an AC-phase voltage having at least three potentials such as a high potential, intermediate potential, and low potential, and an AC motor for driving an electric motor vehicle to which a voltage is supplied by the power converter has a means for allowing the fundamental wave at the output frequency of the above inverter to continue an operation at several Hz at most.

The cause for that the calorific values of the DC side elements and AC side elements are not uniform is that the ON period of the AC side elements is longer than that of the DC side elements, so that the supply current of the AC side elements is larger than that of the DC side elements, such as about 2 or 3 times.

Therefore, the difference between the mean current of the inside switching means and the mean current of the outside switching means is made smaller than the mean current of the outside switching means, so that the differential between the inside and outside currents is decreased and the calorific values are made uniform.

By installing a means for making the total of pulse widths of the high potential and low potential larger than the total of output periods of the intermediate potential included in the half cycle of the AC output phase voltage in the dipolar modulation region, the ON and OFF duty of each switching element becomes almost equal and the supply current of each element is made uniform.

When a three-level inverter including a dipolar modulation means is used as a control apparatus of an electric motor vehicle, the electric motor vehicle can be started at 0 V. Since a means for allowing the fundamental wave at the output frequency of an inverter to continue an operation at several Hz at most is provided using the above advantage, the operation can be performed satisfactorily.

DESCRIPTION OF THE PREFERRED EMBODIMENT

Next, the outline of the present invention will be explained and then an embodiment will be explained with reference to FIGS. 1 to 9.

Recently, a technique for setting an intermediate potential point additionally between a high potential point and low potential point of a DC power supply and operating an induction motor, particularly an induction motor for driving an electric motor vehicle by an inverter which is called a three-level inverter (also called a series multi-inverter or neutral point clamped inverter) for inducing three levels of potentials at the high potential point, low potential point, and intermediate potential point selectively to an AC terminal (as a phase voltage) by turning switching elements selectively ON or OFF is being established.

Major characteristics of this three-level inverter are that since the PWM switching frequency can be increased apparently, AC output with a low harmonic content can be obtained and since the applied voltage to the switching elements can be reduced by dividing the DC voltage supply, the switching elements can be made low dielectric.

Figure 1:
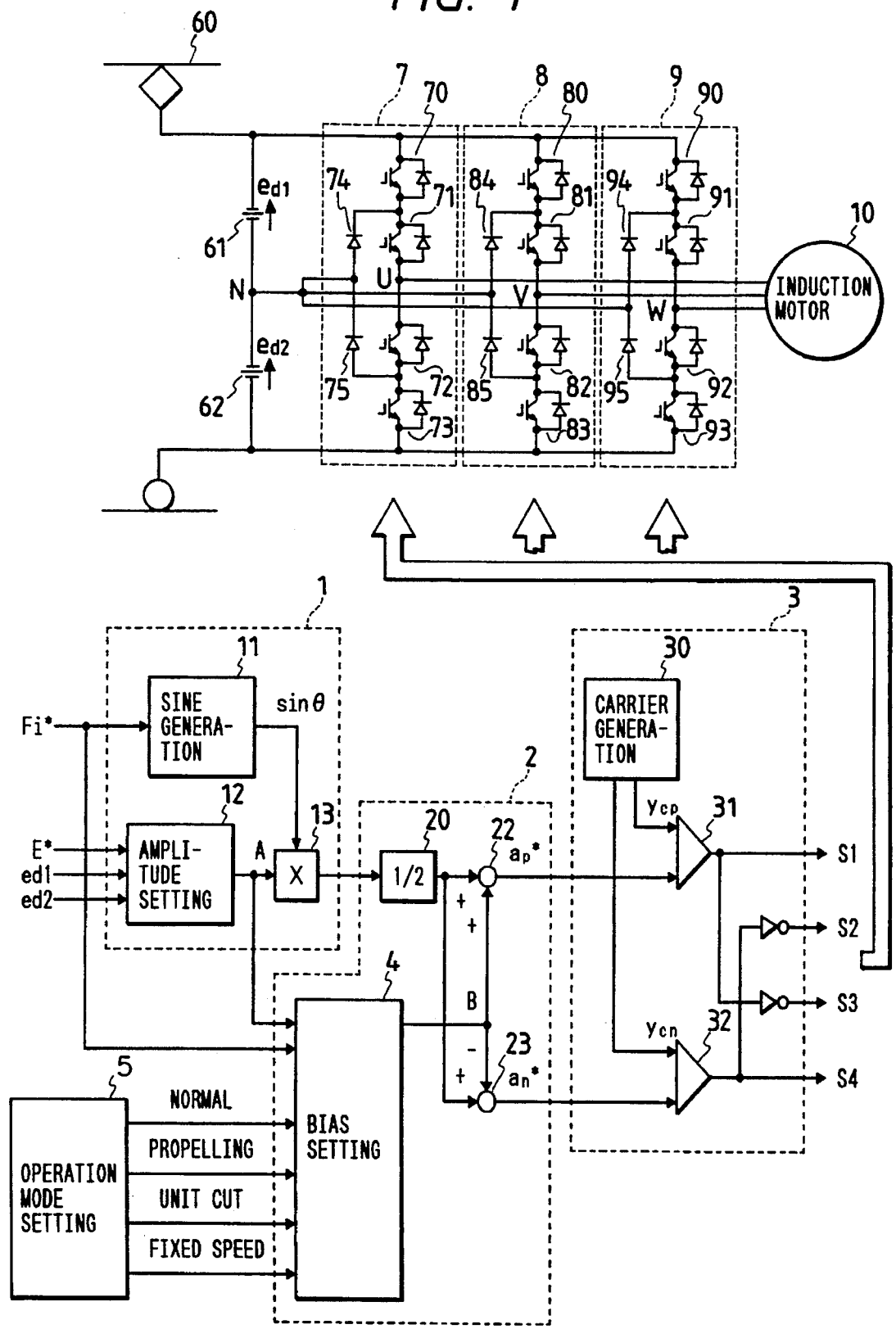
FIG. 1 is a block diagram showing an embodiment of the present invention.

The basic structure of the main circuit (three phase) is shown in FIG. 1.

In FIG. 1, numeral 60 indicates an electric car line which is a DC voltage source, 61 and 62 capacitors which are divided so as to create an intermediate point N (hereinafter called a neutral point) from the voltage of the DC voltage source 60, 70 to 73, 80 to 83, and 90 to 93 self arc-extinguishing type switching elements (although IGBT is used in this example, GTO or transistors may be used) having reflux rectifier cells, and 74, 75, 84, 85, 94, and 95 auxiliary rectifier cells (clamp diodes) for deriving the potential at the neutral point of each capacitor. An induction motor 10 is used as a load.

The basic operation of switching arms 7 to 9 which can be operated independently for each phase will be explained using the switching arm 7 as an example.

It is assumed that voltages $e_{d1}$ and $e_{d2}$ of the capacitors 61 and 62 are completely smooth DC voltage sources and $e_{d1}=e_{d2}=E_d/2$ ($E_d$: entire DC voltage).

In this case, by controlling ON and OFF of the switching elements 70 to 73 as shown in Table 1, three levels of output voltages of $E_d/2$, 0, and $-E_d/2$ can be obtained at an AC output terminal U.

TABLE 1

| Conducting status of switching elements | | | | Switching function | | | | | Output voltage |
|---|---|---|---|---|---|---|---|---|---|
| 70 | 71 | 72 | 73 | $S_1$ | $S_2$ | $S_3$ | $S_4$ | S | e |
| ON | ON | OFF | OFF | 1 | 1 | 0 | 0 | 1 | $E_d/2$ |
| OFF | ON | ON | OFF | 0 | 1 | 1 | 0 | 0 | 0 |
| OFF | OFF | ON | ON | 0 | 0 | 1 | 1 | −1 | $-E_d/2$ |

Symbols $S_1$ to $S_4$ and S indicate switching functions for representing the conducting statuses of the switching elements 70 to 73 by 1, 0, and −1 and they have the following relations.

$$S_2=\bar{S_4},\ S_3=\bar{S_1}, S=S_1-S_4$$

From the above relations, the output voltage e can be expressed by Formula 1.

$$e=S_1 e_{d1}-S_4 e_{d2}=SE_d/2\ (e_{d1}=e_{d2}=E_d/2) \quad (1)$$

"e" has a wave form in which the pulse voltages of $E_d/2$, 0, and $-E_d/2$ are combined. However, S is generally subjected to pulse width modulation (PWM) control so as to bring "e" close to a sine wave. A PWM control apparatus can determine the conducting status of the switching elements by providing $S_1$ and $S_2$.

Details of the main circuit of the three-level inverter are described in Japanese Patent Application Laid-Open No. 56-74088 and Japanese Patent Publication No. 51-47848.

Figure 2:
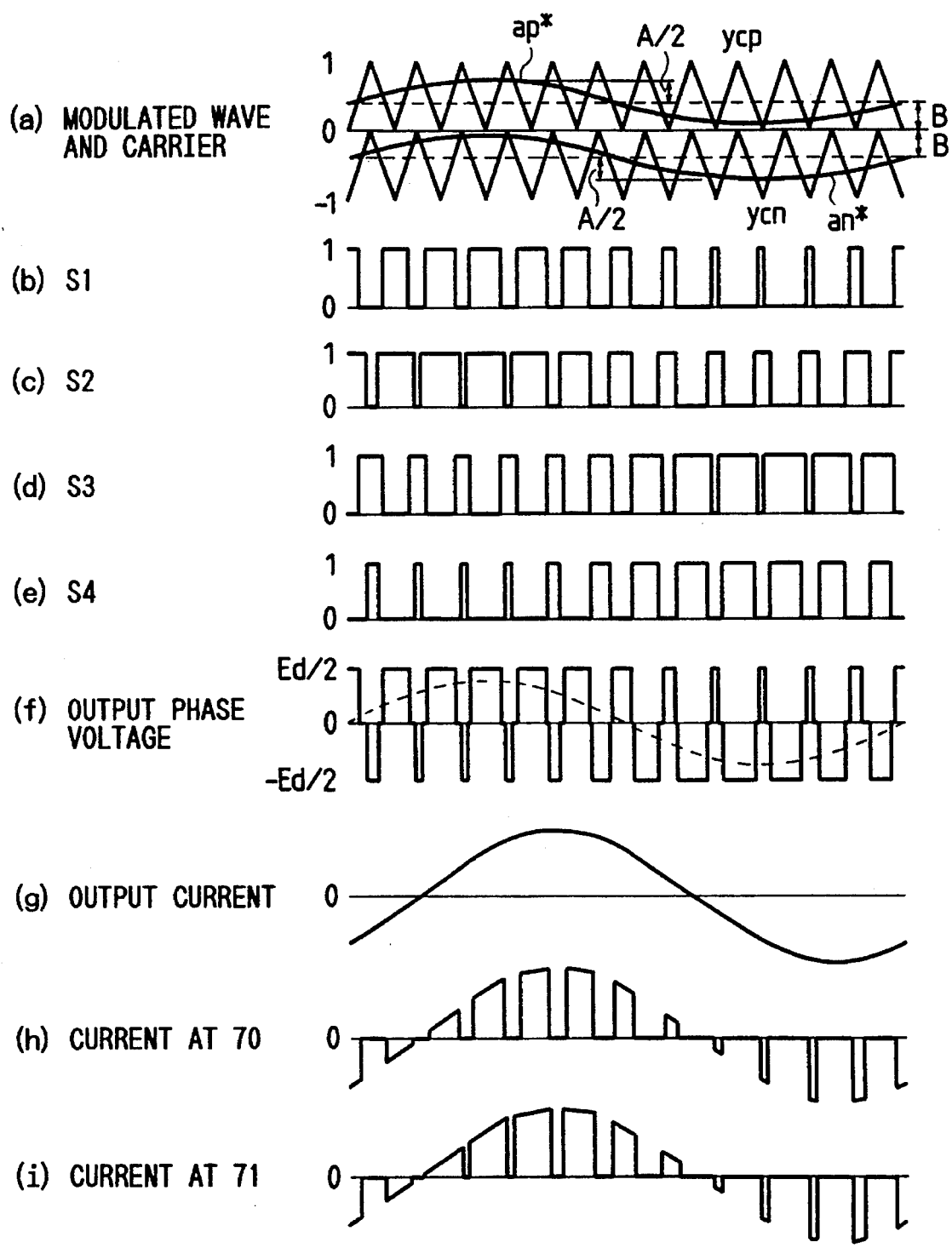
FIG. 2 is a signal diagram showing relations between the switching status of a three-level inverter and output phase voltage.

Next, the relations between an inverter output voltage command, inverter output voltage, and switching element current will be explained with reference to FIGS. 2 and 8.

Figure 8:
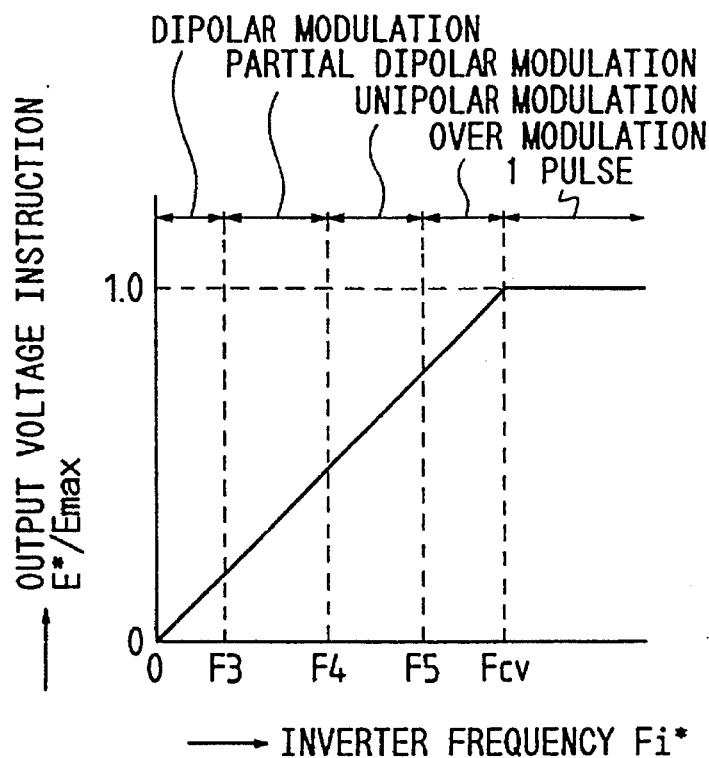
FIG. 8 is a drawing showing the inverter frequency and range of each modulation means.

An inverter output voltage command E* is set as shown in FIG. 8 according to an inverter frequency $F_i^*$. Until the inverter frequency $F_i^*$ reaches $F_{cv}$ when the output voltage E* is maximized, E* increases at an almost same ratio to $F_i^*$ and the output voltage cannot become larger than the electric car line voltage, so that the output voltage is kept at a maximum output voltage of $E_{max}$ when the inverter frequency is more than $F_{cv}$.

Dipolar modulation means a modulation method which is an object of the present invention, and partial dipolar modulation means a modulation method that the dipolar period and unipolar period are contained in the half cycle of the fundamental wave of the inverter output phase voltage, and unipolar modulation means a modulation method that the half cycle of the fundamental wave of the inverter output phase voltage consists of a positive pulse or negative pulse and a zero period, and overmodulation means a modulation method for representing a fundamental wave in which one to several pulses exist at both ends of a wide pulse, and one pulse means a modulation method for representing the half cycle of the fundamental wave by a pulse.

From this inverter output voltage command E* and DC voltage $E_d$, a fundamental wave amplitude command A is set as shown in Formula 2.

$$\begin{aligned} A &= 2\sqrt{2}\ E^*/(e_{d1}+e_{d2}) \\ &= 2\sqrt{2}\ E^*/E_d \end{aligned} \quad (2)$$

Therefore, a fundamental wave command $a_1^*$ is expressed as shown below from the fundamental wave amplitude command A and phase θ.

$$a_1^* = A\sin\theta \quad (3)$$

where, $\theta=2\ F_i^* t$, t: time

Next, the dipolar modulation will be explained with reference to FIG. 2.

The dipolar modulation, as shown in FIG. 2(f), outputs a positive pulse and negative pulse alternately via the intermediate potential (0 in the drawing) so as to represent the fundamental wave voltage as an inverter output phase voltage and can output a low voltage including 0 V. Therefore, this is a convenient modulation method for an induction motor used in an electric motor vehicle which is controlled continuously from 0 V (in the case of gradient start, a negative voltage is also used) to the maximum voltage.

A pulse train in such dipolar modulation is created as shown below.

When $a_n^* > y_{cn}$: $S_4=1$ and $S_2=0$
When $a_n^* > y_{cn}$: $S_4=0$ and $S_2=1$
As a result, the voltage shown in FIG. 2(f) is obtained at the AC output terminal of the inverter.

Assuming that the output current changes like a sine wave as shown in FIG. 2(g), a current flows through the switching elements 70 to 73 in the forward direction or reverse direction shown in Table 2 depending on the switching function S and the polarity of the output current. Where, a symbol i indicates an output current and each empty field indicates zero. FIGS. 2(h) and 2(i) show wave forms of the switching elements 70 and 71. A current with positive polarity is a forward current (IGBT current) and a current with negative polarity is a reverse current (diode current) and "–i" indicates a current which flows from the load.

TABLE 2

| S | Polarity of output current | Current of 70 Forward | Current of 70 Reverse | Current of 71 Forward | Current of 71 Reverse | Current of 72 Forward | Current of 72 Reverse | Current of 73 Forward | Current of 73 Reverse |
|---|---|---|---|---|---|---|---|---|---|
| 1 | + | i | | i | | | | | |
|   | − | | i | | i | | | | |
| 0 | + | | | i | | | | | |
|   | − | | | | | −i | | | |
| −1 | + | | | | | −i | | −i | |
|   | − | | | | −i | | −i | | |

The fundamental wave command $a_1^*$ given by Formula 3 is halved as shown in FIG. 2(a). The upper side of a boundary of 0 shown in FIG. 2(a) is a region for creating a positive pulse train and the lower side is a region for creating a negative pulse train.

The fundamental wave command $a_1^*$ which is halved is handled as two amplitude commands and they are added with a bias value as described later so as to create a positive amplitude command $a_p^*$ and a negative amplitude command $a_n^*$. The creation formula is Formula 4.

$$a_p^* = a_1^*/2 + B$$

$$a_n^* = a_1^*/2 - B \qquad (4)$$

where B indicates a bias value.

The bias value B biases each amplitude command in a predetermined direction by superimposing the DC part on the amplitude command and indicates the depth of dipolar modulation. In this embodiment, the bias value is represented by a ratio to the carrier amplitude.

Figure 4:
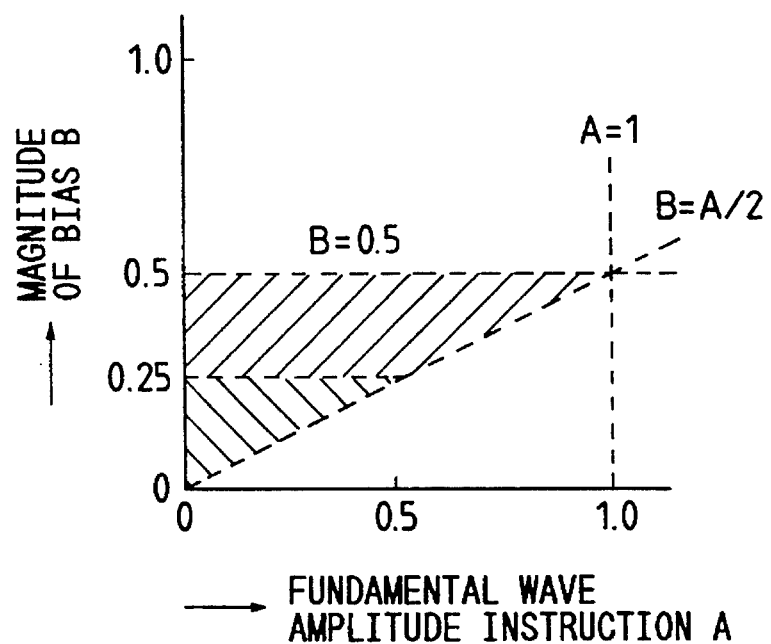
FIG. 4 is a drawing showing the dipolar modulation region.

The setting range of the bias value B is a region which is marked with diagonal lines and meshes as shown in FIG. 4, that is, it is limited to a range of $A/2 \geq B > 0.5$.

The reason is that when $B > A/2$, a part of the amplitude command crosses the zero line and partial dipolar modulation takes place instead of dipolar modulation or when $B = 0.5$, bipolar (two-level) modulation with no intermediate potential takes place instead of dipolar modulation.

The maximum output voltage in dipolar modulation is an intersection point of the line of bias value B and the line of $B = A/2$.

From relative sizes between the positive and negative amplitude commands $a_p^*$ and $a_n^*$ shown in Formula 4 and two carrier signals $y_{cp}$ and $y_{cn}$ shown in FIG. 2(a), 4 and two carrier signals $y_{cp}$ and $y_{cn}$ shown in FIG. 2(a), the switching functions $S_1$ to $S_4$ shown in FIGS. 2(b) to 2(e) are obtained as shown below.

When $a_p^* > y_{cp}$: $S_1 = 0$ and $S_3 = 1$
When $a_p^* / y_{cp}$: $S_1 = 1$ and $S_3 = 0$, and When the inverter output phase voltage is changed in the order of 0 --/$E_d$/2 --/0 --/--$E_d$/2 (the period of $t_1$ --/$t_2$ --/$t_3$ --/$t_4$ shown in FIG. 3) during dipolar modulation, the period is considered as one cycle.

A current of −i flows through the switching element 72 during the period $t_1$, and a current of i flows through the switching elements 70 and 71 during the period $t_2$, and a current of i flows through the switching element 71 during the period $t_3$, and a current of −i flows through the switching elements 72 and 73 during the period $t_4$. The sum of currents flowing through the switching elements in this cycle is i for the DC side elements or 2 i for the AC side elements respectively.

Therefore, it is found that the current flowing through the AC side elements is larger.

In this case, a difference is generated in the calorific value between the AC side elements and DC side elements. Therefore, when the capacity of a cooler is designed according to the AC side elements, the equipment will be made larger.

Considering a case that dipolar modulation is used for a control apparatus of an induction motor for an electric motor vehicle in consideration that it is used to represent a zero voltage or low voltage, it is used mostly in a low frequency region and a period that a current close to the peak value of the output current flows through the elements continuously exists.

Therefore, the difference in heat generation is spread increasingly, so that it is necessary to make the heat distribution of dipolar modulation in this region uniform.

Next, the simulation result will be described and then an embodiment of countermeasures will be explained.

Figure 9A:
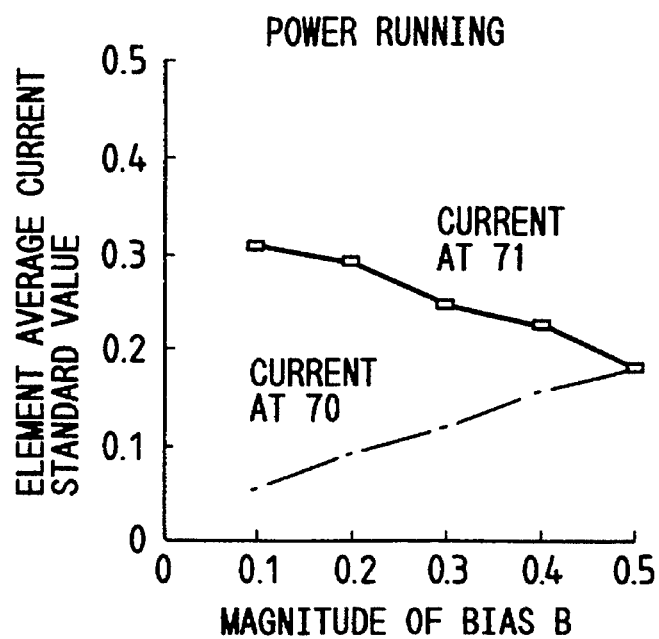
FIGS. 9(a) and 9(b) are drawings showing relations between the bias value and element current.
Figure 9B:
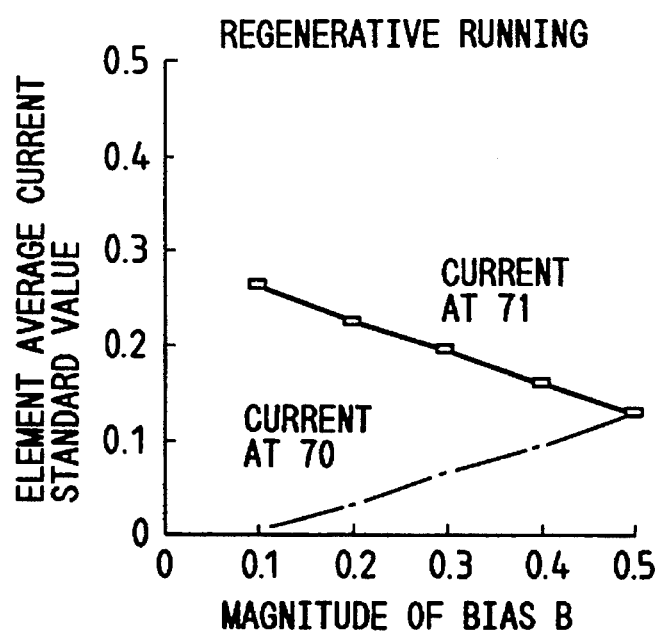

Examples of results when relations between the bias value B and the mean current flowing through the switching elements 70 and 71 in the forward direction are obtained by computer simulation are shown in FIG. 9. For both of motoring and regeneration, as B reaches 0.5, the element currents can be made uniform.

Assuming the zero voltage period as $T_0$, $T_0$ can be expressed as a function of bias value B as shown below.

$$T_0 = (1-2B)/2F_c \qquad (5)$$

where, $F_c$: Carrier frequency

By setting the zero voltage period as short as possible, currents can be made uniform. In other words, $t_1+t_3$ ($=2T_0$) shown in FIG. 3 can be made shorter.

Next, a structure for realizing the above function will be explained.

FIG. 1 shows an example of a control apparatus for controlling ON and OFF of four series switching elements and outputting an AC voltage which changes between three levels of potential. Only the part of one phase is shown in the drawing.

In FIG. 1, a fundamental wave voltage command generating means 1 inputs an inverter output voltage frequency command $F_i^*$, output voltage effective value command $E^*$, and DC voltages $e_{d1}$ and $e_{d2}$, obtains an inverter output voltage command $A\sin\theta$ ($\theta$: phase, $\theta = 2F_i^* t$, t: time), and outputs it to an amplitude command distributing means 2.

A bias setting means 4 outputs a bias value B which is set (operated) according to the inverter frequency $F_i^*$ and fundamental wave amplitude command value A (details will be described later).

The amplitude command distributing means 2 which inputs the inverter output voltage command $A\sin\theta$ and determines the bias value B generates a positive amplitude command $a_p^*$ and a negative amplitude command $a_n^*$ shown in FIG. 2(a) according to Formula 4.

Furthermore, a pulse generating and distributing means 3 creates PWM pulse trains $S_1$ to $S_4$ which are given to the switching elements on the basis of the positive amplitude command $a_p^*$ and negative amplitude command $a_n^*$ These PWM pulse trains $S_1$ to $S_4$ are given to the switching elements 70 to 73 with a U phase via a gate amplifier which is not shown in the drawing so as to control ON and OFF of each element.

Next, the structure of the PWM pulse trains will be explained in detail.

A phase of $\theta$ is obtained by integrating a frequency command $F_i^*$ of the inverter output voltage which is obtained by addition and subtraction of the slip frequency which is obtained on the basis of the deviation of a motor current command and motor actual current and of the motor rotation frequency by time and $\sin\theta$ is calculated by a sin generator 11 on the basis of $\theta$. The value of $\sin\theta$ and the fundamental wave voltage amplitude command value A which is obtained from the output voltage effective value command $E^*$ in proportion to the above frequency command $F_i^*$ and from the DC voltages $e_{d1}$ and $e_{d2}$ (when the power source is a precise voltage source, $E_d$ may be used) by an amplitude setter 12 are multiplied by a multiplier 13 and an instantaneous fundamental wave voltage command $A\sin\theta$ is outputted.

The bias value B which is set by the bias setting means 4 according to the fundamental wave amplitude command value A is added to or subtracted from a signal, which is obtained by halving (other than ½ may be used, though the structure of the subsequent stage is slightly complicated) the fundamental wave voltage command $A\sin\theta$ which is inputted from the fundamental wave voltage command generating means 1 by a halver 20, by an adder 22 or 23 and the positive amplitude command $a_p^*$ and negative amplitude command $a_n^*$ are created.

A pulse generator 31 compares the positive amplitude command $a_p^*$ which is outputted from the amplitude command distributing means 2 with the carrier signal $y_{cp}$ which is inputted from a carrier generator 30 and creates a switching function $S_1$ which is equal to the positive pulse pattern.

A pulse generator 32 also compares the negative amplitude command $a_n^*$ with the carrier signal $y_{cn}$ which is inputted from the carrier generator 30, creates a switching function $S_4$ which is equal to the negative pulse pattern, and generates gate signals $S_1$ to $S_4$.

Next, the operation of the bias setting means 4 will be explained with reference to FIGS. 4 to 6.

As to dipolar modulation, it is described that by setting the zero voltage period as short as possible, currents shared by the switching elements can be made uniform. However, to make voltages shared by the switching elements proper or to apply the half voltage of the DC voltage surely to each switching element, it is necessary to reserve a predetermined zero voltage period.

Assuming the minimum value of the zero voltage period $T_0$ as $T_{0min}$, it is found from Formula 5 that the maximum value $B_{max}$ of B can be expressed as shown below:

$$B_{max} = 0.5 - F_c T_{0min} = 0.5 - \Delta \qquad (6)$$

where $\Delta = F_c T_{0min}$

In the region (marked with meshes) which is larger than $B=A/2$ and $B=0.25$ and smaller than $B_{max}$ in FIG. 4, the heat distribution can be made uniform. In other words, the uniformity can be established by fixing the bias value B which is outputted from the bias setting means 4 to a fixed value in the region.

As a practical matter, it is necessary to mount a limiter to the bias setting means 4 so as to prevent the bias value from shifting to another region. It will be explained hereunder.

Figure 5:
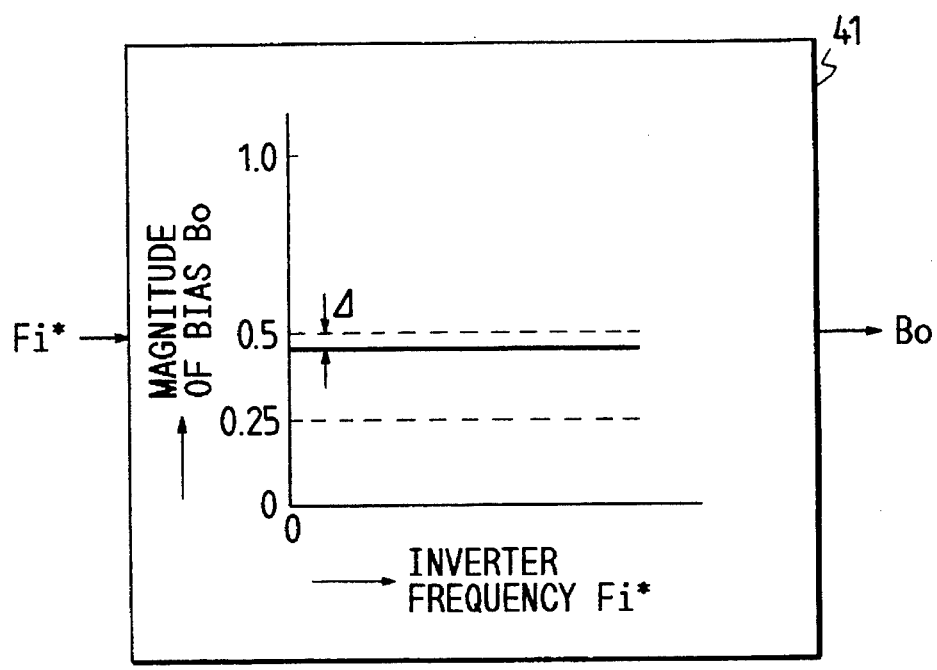
FIG. 5 is a drawing showing an example of setting of the bias value.
Figure 6:
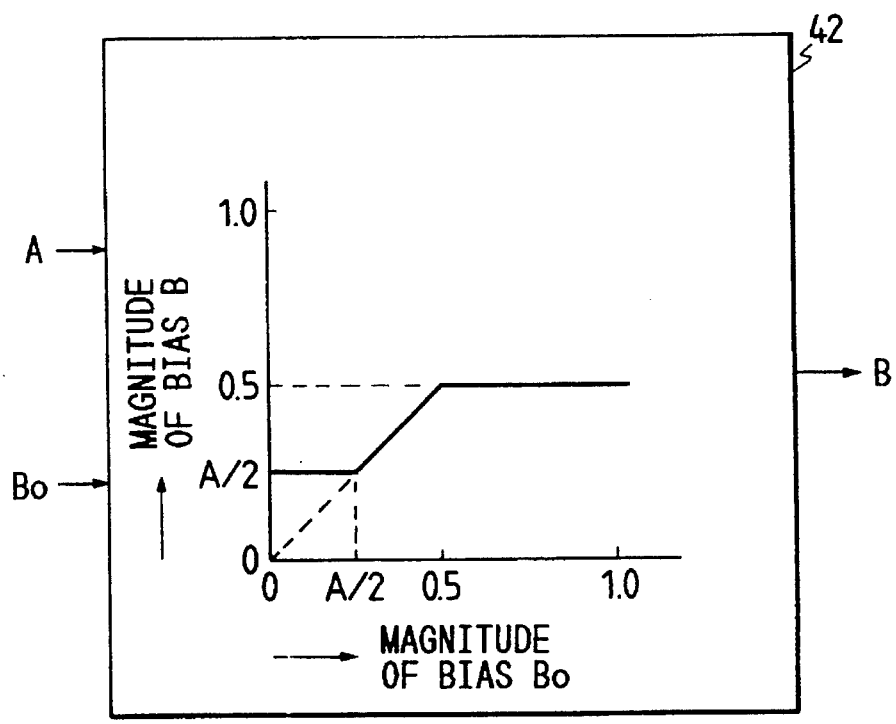
FIG. 6 is a drawing showing a limitation means for the set bias value.

FIGS. 5 and 6 are detailed drawings of the bias setting means 4.

A bias value generating means 41 outputs a bias value of $B_0$ according to the inverter frequency $F_i^*$. A limiter 42 inputs the fundamental wave voltage amplitude command value A and bias value $B_0$ and prevents the bias value B from being set outside the dipolar region.

The bias value $B_0$ which is outputted from the bias value generating means 41 is a most suitable fixed value for making currents, which are not changed against the inverter frequency $F_i^*$, uniform. However, for example, the bias value $B_0$ may be changed according to the inverter frequency in consideration of current ripples.

This embodiment will be explained with reference to FIG. 7.

By setting the bias value B to $0.5-\Delta$ within the period that the inverter frequency $F_i^*$ is lower than $F_1$, decreasing B as $F_i^*$ increases ($F_1 \geq F_i^* \geq F_2$), and setting B to about 0.25 when $F_i^* < F_2$, it is possible to make generation losses uniform in a low frequency band where changes of heat generation due to the generation loss are large and to reduce harmonics of the output current in a comparatively high frequency band. Needless to say, also when $F_1=F_2$, the same result can be obtained.

A bias value generating means 43 outputs the bias value $B_0$ which is obtained on the basis of the inverter frequency $F_i^*$ and outputs the bias value B via the limiter 42 shown in FIG. 6.

According to the present invention, it is possible to make currents of the switching elements constituting the main circuit of the inverter uniform and to make generated element loses almost uniform. As a result, the heat generation distribution is made uniform and the equipment can be made small.

Figure 10:
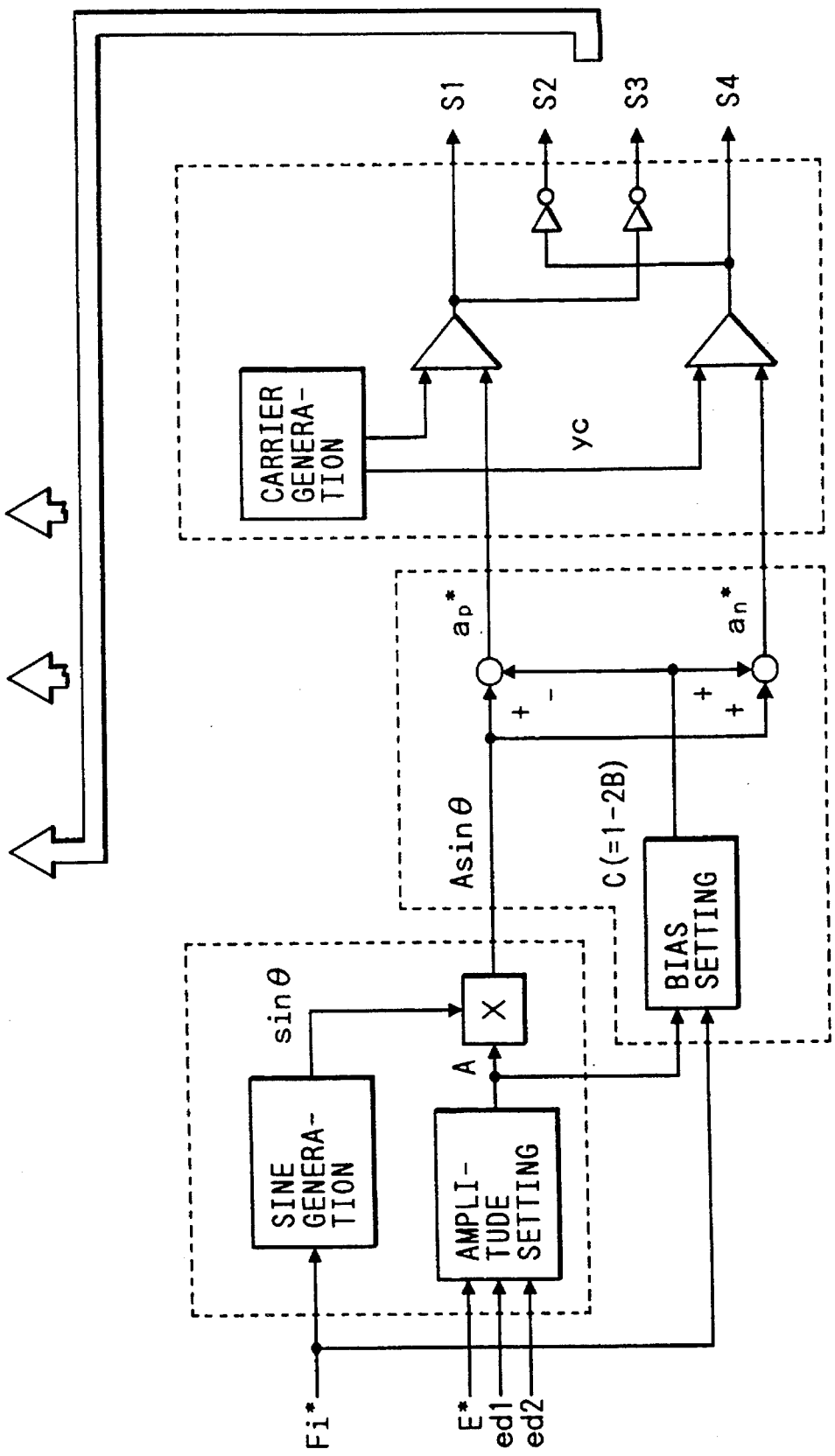
FIG. 10 is a block diagram of another embodiment.

Another embodiment is shown in FIG. 10. According to this embodiment, an operation which is equivalent to that of the embodiment shown in FIG. 1 can be performed by a carrier signal.

Figure 11:
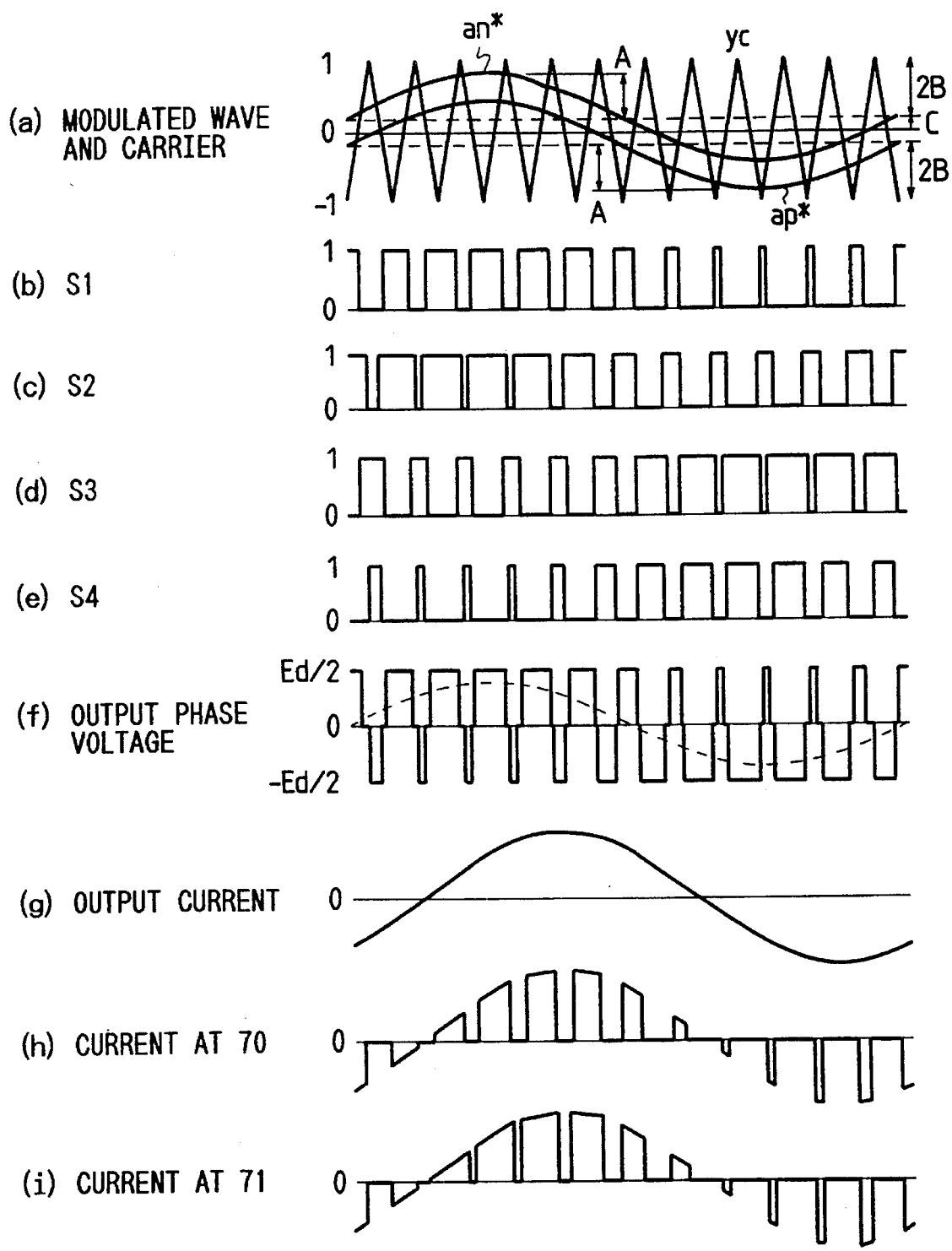
FIG. 11 is a drawing showing relations between the switching status of a three-level inverter and output phase voltage of another embodiment.

Firstly, the basic operation will be explained with reference to FIG. 11.

A point for which the fundamental wave command $a_1^*$ is expressed by the formula shown below from the inverter frequency command $F_i^*$, output voltage command $E^*$, and DC voltage $E_d$ is the same as that of the embodiment shown in FIG. 1.

$$a_1^* = A\sin\theta \quad (7)$$

where $A = 2\pi \ 2E^*/E_d$ and $\theta = 2\pi \ F_i^* t$ (t: time). From the formula, two amplitude commands $a_p^*$ and $a_n^*$ are created according to the following formulas as shown in FIG. 11(a).

$$a_p^* = a_1^* - C$$

$$a_n^* = a_1^* + C \quad (8)$$

where, C: Offset value

The bias value C is expressed by the following relation with the bias value B of the embodiment shown in FIG. 1.

$$C = 1 - 2B \quad (9)$$

The setting range of the bias value C is limited to a region of $0 > C \geq 1-A$ and the wave form is as shown in FIG. 11(a). When C=0, bipolar modulation (two levels) having no intermediate potential takes place.

From relative sizes of the positive and negative amplitude commands $a_p^*$ and $a_n^*$ expressed by Formula 8 and the carrier signal $y_c$ shown in FIG. 11(a), the switching functions $S_1$ to $S_4$ shown in FIGS. 11(b) to 11(e) are obtained as shown below.

When $a_p^* < y_c$: $S_1 = 0$ and $S_3 = 1$
When $a_p^* > y_c$: $S_1 = 1$ and $S_3 = 0$
When $a_n^* < y_c$: $S_4 = 1$ and $S_2 = 0$
When $a_n^* > y_c$: $S_4 = 0$ and $S_2 = 1$ The wave forms in FIGS. 11(b) to 11(e) are exactly the same as those in FIGS. 2(b) to 2(e) and the wave forms in FIGS. 11(f) to 11(i) also match those in FIGS. 2(f) to 2(i). Next, the structure for realizing the above functions will be explained.

In FIG. 10, a fundamental wave voltage command generating means 1 and the main circuit of the inverter are the same as those of the embodiment shown in FIG. 1. Numeral 4 indicates a bias setting means, which sets a bias value of C according to Formula 9 and the relations in FIGS. 4 to 7. Numeral 2 indicates an amplitude command distributing means, which subtracts or adds the bias value C which is set by the bias setting means 4 according to the fundamental wave amplitude command value A from or to the fundamental wave voltage command $A\sin\theta$ which is inputted from the fundamental wave voltage command generating means 1 by an adder 22 or 23 and creates the positive amplitude command $a_p^*$ and negative amplitude command $a_n^*$.

A pulse generator 31 compares the positive amplitude command $a_p^*$ which is outputted from the amplitude command distributing means 2 with the carrier signal $y_c$ which is inputted from a carrier generator 30 and creates a switching function $S_1$ which is equal to the positive pulse pattern. A pulse generator 32 also compares the negative amplitude command $a_n^*$ with the carrier signal $y_c$ which is inputted from the carrier generator 30, creates a switching function $S_4$ which is equal to the negative pulse pattern, and generates gate signals $S_1$ to $S_4$.

According to this embodiment, a result which is quite equivalent to that of the embodiment shown in FIG. 1 can be obtained by a carrier signal.

Needless to say, by using a microprocessor, a part or the whole of the above control apparatus can be programmed so as to realize by software.

This embodiment is an example using a single phase. However, needless to say, multi-phase such as two phase or three phase can obtain the same result.

According to the aforementioned first and second embodiments, current uniformity control is applied to the entire dipolar modulation region. In the following embodiments, whether or not to apply current uniformity control to the dipolar modulation region may be determined according to the phase of the fundamental wave command $a_1^*$. Next, it will be explained with reference to FIGS. 12 and 13.

Figure 12:
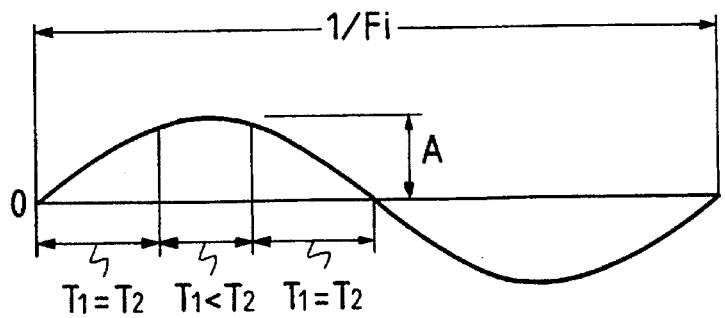
FIG. 12 is a drawing showing another embodiment of the operating range of the present invention.

FIG. 12 shows an example that the control status is changed during the half cycle of the fundamental wave.

Figure 3:
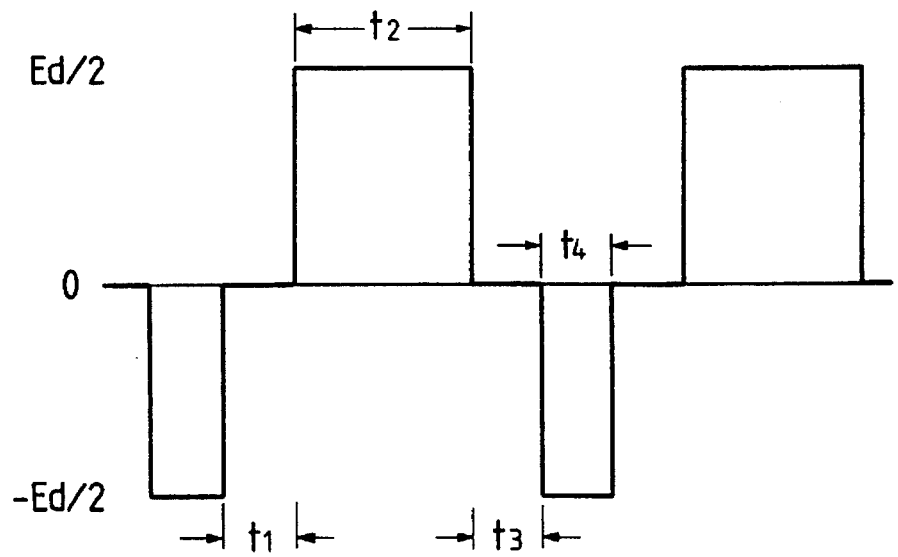
FIG. 3 is an enlarged view of the output phase voltage shown in FIG. 2.

A symbol $T_1$ indicates the 0 period $(t_1+t_3)$ shown in FIG. 3 and $T_2$ indicates the ON period $(t_2+t_4)$.

According to this embodiment, current uniformity control is applied to a region with a large amplitude (the same may be said with the negative side). By doing this, the current distribution is made uniform in a place where many currents flow and ripples are reduced in a place where a small number of currents flow $(T_1 = T_2)$. Therefore, ripples of the current wave form are reduced and the heat distribution is made uniform.

Figure 13:
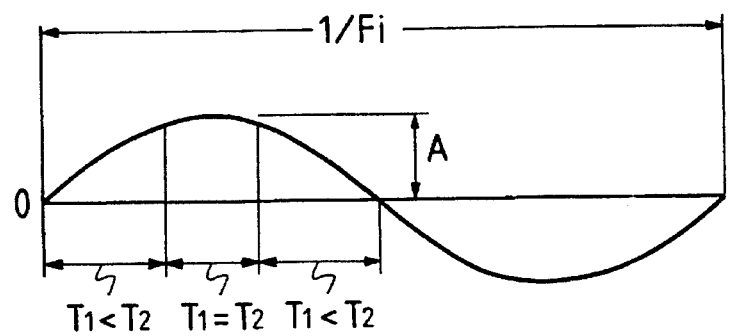
FIG. 13 is a drawing showing another embodiment of the operating range of the present invention.

FIG. 13 shows a reverse example of the above embodiment.

In this case, current ripples in the part participating in the mean value of voltage are reduced.

Furthermore, by selecting one of the embodiments shown in FIGS. 12 and 13 according to the inverter frequency $F_i^*$, most suitable control can be applied. For example when $0 \geq F_i^* \geq F_6$ ($F_6$ is in the dipolar region), the embodiment shown in FIG. 12 is used. When $F_6 \geq F_i \geq F_7$ ($F_7$ is in the dipolar region), the embodiment shown in FIG. 13 is used. By doing this, priority can be given to heat distribution uniformity in the low frequency band and priority can be given to current ripple reduction control in the next frequency band.

The embodiments shown in FIGS. 12 and 13 can be structured easily by inputting a phase from the sin generator 11 into the bias setting means 4.

The above is an explanation of heat loss uniformity control on the basis of a predetermined pattern. However, the same result may be obtained by the following.

Firstly, current ripples are detected from the output current. When the ripple value is within the tolerance, uniformity control is applied. When the ripple value is beyond the tolerance, the bias value is set to 0.25. The tolerance is required to have a hysteresis.

Secondly, a thermometer (an ammeter) is installed for each element. When the temperature difference is more than a predetermined value, uniformity control is applied. When the temperature difference is less than the predetermined value, the bias value is set to 0.25 so as to reduce current ripples.

According to this embodiment, control can be applied on the basis of the actual value instead of the pattern. Therefore, the loss difference can be made smaller than the target value.

Next, the effects of the present invention mentioned above will be explained.

Figure 14:
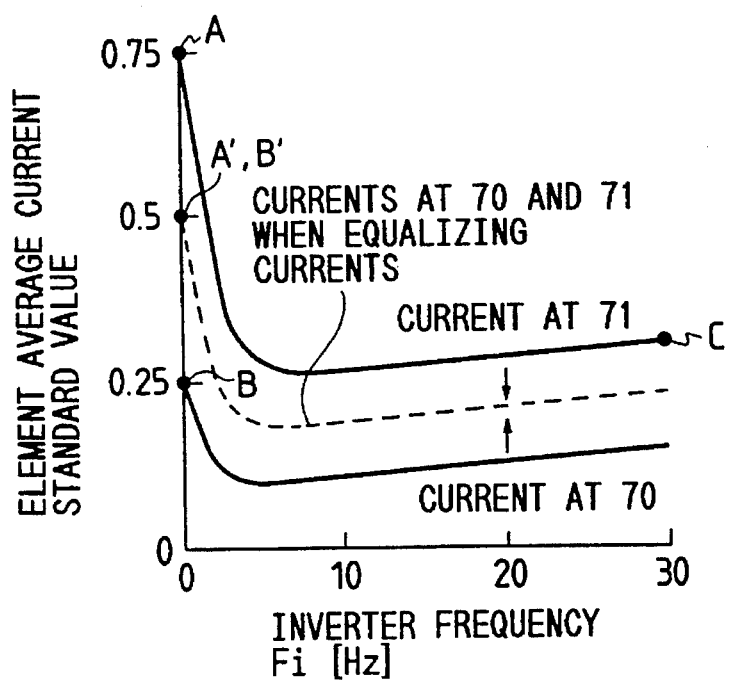
FIG. 14 is a drawing showing element mean current requirements vs the inverter frequency when the present invention is executed and not executed.

FIG. 14 is a characteristic diagram of currents flowing through the outside element 70 and inside element 71 vs the inverter frequency $F_i^*$ when the present invention is not applied and applied.

The mean current of inside element in the low frequency band (from 0 to several Hz) in this graph is expressed by the following formula.

$$\text{Mean current} = (1-B)I_m \quad (10)$$

where,

B: Bias value $I_m$: Amplitude of inverter output current

The mean current in a frequency band which is higher than the above frequency band is expressed by the following formula.

$$\text{Mean current} = ((A/8) \cos \phi + (1-B)/\pi) I_m \quad (11)$$

where,

A: Fundamental wave voltage command (percentage modulation)

$\phi$: Power factor angle

In this case, the capacity of a cooler is designed on the basis of the calorific value at the point A. Therefore, by lowering the point A down to the point A', the cooler can be made smaller.

For example, if no current uniformity control is applied when the effective value of output current is 400 A and the switching frequency is 300 Hz, a large loss such as about 1725 W is generated by a drop of the forward voltage. If current uniformity control is applied, only a loss of about 1195 W is generated by a drop of the forward voltage. As a result, it is calculated that the volume of the heat radiation section can be reduced to about ⅕.

Assuming that the element current capacity of the mean current of the DC side element (inside element) shown in FIG. 14 at the point C (at the maximum output voltage when B=0.25 and A=0.5 due to harmonic reduction, so that the dipolar modulation will be lost if A increases over the value) is 100%, it is necessary to design so that the current capacity at the point A is added to the element current capacity.

However, since it is necessary to use an element with a large current capacity for a low frequency such as 0 Hz to several Hz at most, the equipment will be made large.

When current uniformity control is applied now, the element mean current can be reduced to A', so that there is no need to add a large current capacity to the element current capacity compared with the element current capacity of the mean current of the inside element at the point C.

To decrease the element mean current, a reduction of the inverter output current Im is possible. When such control is applied, an element with a small current capacity can be used without doubt. However, when this inverter is used for an apparatus for controlling an electric motor vehicle, the torque of an AC motor (induction motor) reduces and the motor cannot start at the time of upslope start (the inverter is useful in other than such a special operation).

The above is summarized in Table 3.

TABLE 3

| | Inverter output current $I_m$ | | |
|---|---|---|---|
| | 100% | 60% | 40% |
| Element current capacity at C | 100% | — | — |
| Element current capacity at A' | 166% | 100% | — |
| Element current capacity at A | 249% | 150% | 100% |

This table is created using Formulas 10 and 11.

Therefore, the table shows that when the current uniformity control or other control is applied, at least an element having a current capacity which is less than 2.49 times of the element current capacity at the point C can be used. By doing this, the elements can be made smaller and the entire inverter system also can be made smaller.

Here, the unbalance degree $E_b$ which is an index for indicating the magnitude of difference in current between the inside and outside elements will be defined.

$$E_b = ((I_i - I_o)/I_i) \quad (12)$$

where, $I_i$: Mean current of inside element $I_o$: Mean current of outside element Here, each mean current in the almost flat region including the point C shown in FIG. 14 can be expressed as shown below.

$$I_o = ((A/8) \cos \phi + B/\pi) I_m$$

$$I_i = ((A/8) \cos \phi + (1-B)/\pi) I_m \quad (13)$$

The unbalance degree $E_b$ can be expressed:

$$E_b = (1-2B)/((A/8) \cos \phi + (1-B)) \quad (14)$$

as shown above.

For example, the unbalance degree $E_b$ when the inverter frequency is several Hz (in the region containing the points A and A' shown in FIG. 14 where the mean current is changed suddenly) can be calculated from Formula 14 on the assumption that A=0.

The unbalance degree $E_b$ in the flat region including the point C shown in FIG. 14 (the inverter frequency is not less than several Hz) is nearly equal to 0.528 when B=0.25, A=0.5 (when the bias value is 0.25, the maximum fundamental wave amplitude will not exceed 0.5), and a power factor of 1 are used in Formula 14. When this current uniformity control is applied, the unbalance degree will become smaller than this value.

Therefore, as to the unbalance degree Eb, a relation of $0 \geq Eb \geq 0.52$ is held. In other words, the difference between the mean current of the inside element and the mean current of the outside element can be made smaller than the mean current of the outside element.

When the dipolar modulation is used for an apparatus for controlling an electric motor vehicle, particularly in a special operation of an electric motor vehicle, for example, in a constant speed operation at a low speed such as upslope start or car washing which is continued under the condition that the inverter frequency $F_i^*$ is several Hz at most, the operation time at an inverter frequency of several Hz at most or the operation time in the region where the current of the inside element (DC side element) increases suddenly increases. Therefore, when an element having the element current capacity at the point C is used for the inverter, there are possibilities that the element is damaged due to heat generation of the element (heat generation of the inside element). To avoid this, it is necessary to make the cooler larger than that of unipolar modulation.

However, as shown in Table 1, by decreasing the output current or applying current uniformity control only in this region, the aforementioned special operation can be performed.

In other words, when the operation mode is specified by the operation mode setter 5 shown in FIG. 1, the command is inputted into the bias setter 4 and a bias value B corresponding to the operation mode is set.

Figure 7:
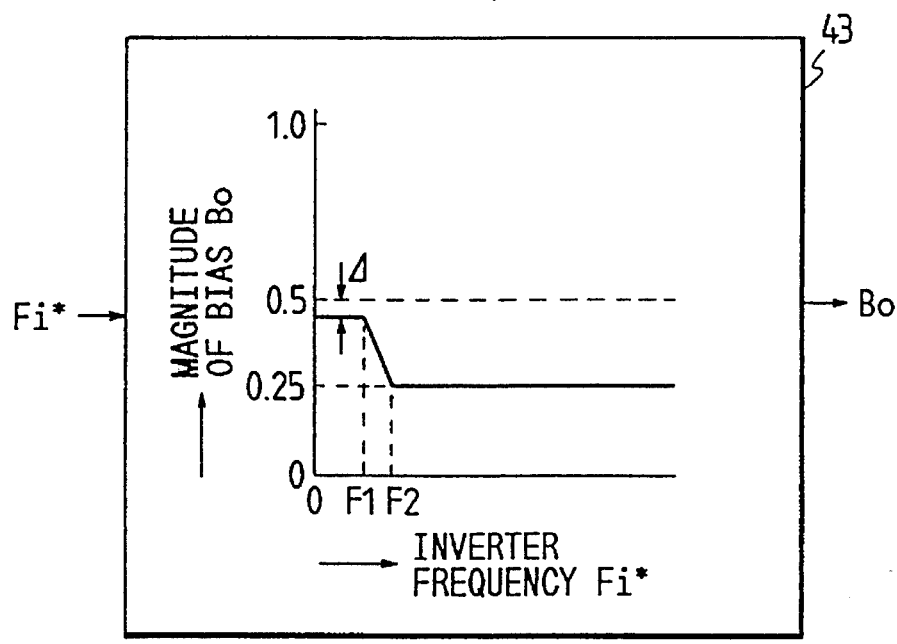
FIG. 7 is a drawing showing another example of setting of the bias value.

For example, at the time of start in the case of unit cut, at the time of a constant speed operation at a low speed, or at the time of upslope start, the inverter frequency $F_i^*$ for which the bias value B decreases as shown in FIG. 7 is set to a higher value. By doing this, it is possible to make generation of heat loss uniform and to prevent the inside element from local heat destruction. Therefore, the special operation can be continued without changing the size of the cooler greatly.

Therefore, in an apparatus for controlling an electric motor vehicle having a control system wherein dipolar modulation is performed by a three-level inverter, a new electric motor vehicle having a means for continuing the above special operation can be provided.

According to all the embodiments mentioned above, an induction motor is used as a load for explanation. However, another AC motor or load unit may be used so as to obtain the same result.

According to the aforementioned embodiments, inverters are used. By connecting the output terminal of an inverter to an AC power source via a reactance element, the inverter can be operated as a self-excited converter for converting an alternating current to a direct current (an operation which is the same as the regenerative operation of the inverter). Also in this case, a result which is the same as that of the inverter can be expected.

According to the present invention, it is possible to miniaturize an inverter system, to make the heat generation distribution of switching elements constituting the main circuit of the inverter uniform, and to realize an apparatus for controlling an electric motor vehicle which can perform a good operation.

What is claimed is:

1. An apparatus for controlling a power converter comprising a power converter for converting a direct current to an AC phase voltage having a high potential, intermediate potential, and low potential by selective switching by a switching means and a modulation means for representing a half cycle of an AC output phase voltage of the power converter by outputting the high potential and low potential alternately via the intermediate potential, wherein said apparatus has a control means for making a difference between a mean current of currents flowing through a switching means for outputting said intermediate potential and a mean current of currents flowing through a switching means connected to one of the high potential and low potential of said direct current lower than the mean current of currents flowing through the switching means connected to the one of the high potential and low potential of said direct current.

2. An apparatus for controlling a power converter comprising a power converter for converting a direct current to an AC phase voltage having a high potential, intermediate potential, and low potential by selective switching by a switching means and a modulation means for representing a half cycle of an AC output phase voltage of the power converter by outputting the high potential and low potential alternately via the intermediate potential, wherein said apparatus has a control means for making an unbalance degree between a mean current of current flowing through a switching means for outputting said intermediate potential and a mean current of currents flowing through a switching means connected to one of the high potential and low potential of said direct current, which is set to a value when a difference between the mean current of currents flowing through the switching means for outputting the intermediate potential and the mean current of currents flowing through the switching means connected to the one of the high potential and low potential of said direct current is divided by the mean current of currents flowing through the switching means for outputting said intermediate potential, within a range of $0 \geq$ unbalance degree $\geq 0.52$.

3. An apparatus for controlling a power converter comprising a modulation means for converting a direct current to an AC phase voltage having at least three potentials such as a high potential, intermediate potential, and low potential and for representing a half cycle of an AC output phase voltage by outputting the high potential and low potential alternately via the intermediate potential, wherein said apparatus has a means for making a total of pulse widths of the high potential and low potential larger than a total of output periods of the intermediate potential included in the half cycle of the AC output phase voltage.

4. An apparatus for controlling a power converter comprising a modulation means for converting a direct current to an AC phase voltage having at least three potentials such as a high potential, intermediate potential, and low potential and for representing a half cycle of an AC output phase voltage by outputting the high potential and low potential alternately via the intermediate potential, wherein said apparatus has a means for making a total of pulse widths of the high potential and low potential larger than a total of output periods of the intermediate potential included in the half cycle of the AC output phase voltage and a means for changing the output period of the intermediate potential.

5. An apparatus for controlling a power converter comprising a modulation means for converting a direct current to an AC phase voltage having at least three potentials such as a high potential, intermediate potential, and low potential and for representing a half cycle of an AC output phase voltage by outputting the high potential and low potential alternately via the intermediate potential, wherein said apparatus has a means for making a total of pulse widths of the high potential and low potential larger than a total of output periods of the intermediate potential included in the half cycle of the AC output phase voltage and a means for changing the output period of the intermediate potential according to an output frequency of said power converter.

6. An apparatus for controlling a power converter comprising a power converter for converting a direct current to an AC phase voltage having at least three potentials such as a high potential, intermediate potential, and low potential and for representing a half cycle of an AC output phase voltage by outputting the high potential and low potential alternately via the intermediate potential, wherein said apparatus has a means for making a total of pulse widths of high potential and low potential larger than a total of output periods of the intermediate potential included in the half cycle of the AC output phase voltage and a means for changing the output period of the intermediate potential according to an output frequency of said power converter.

7. An apparatus for controlling a power converter comprising a modulation means for converting a direct current to an AC phase voltage having at least three potentials such as a high potential, intermediate potential, and low potential and for representing a half cycle of an AC output phase voltage by outputting the high potential and low potential alternately via the intermediate potential, wherein said apparatus has a means for making a sum of a width of a high potential pulse included in the AC output phase voltage and a width of a low potential pulse which is neighboring the high potential pulse via the intermediate potential larger than a sum of output periods of the intermediate potential which is neighboring the high potential pulse.

8. An apparatus for controlling a power converter comprising a modulation means for converting a direct current to an AC phase voltage having at least three potentials such as a high potential, intermediate potential, and low potential and for representing a half cycle of an AC output phase voltage by outputting the high potential and low potential alternately via the intermediate potential, wherein said apparatus has a means for changing a sum of output periods of said intermediate potential so that a sum of a width of a high potential pulse included in the AC output phase voltage and a width of a low potential pulse which is neighboring the high potential pulse via the intermediate potential larger than a sum of output periods of the intermediate potential which is neighboring the high potential pulse.

9. An apparatus for controlling a power converter comprising a modulation means for converting a direct current to an AC phase voltage having at least three potentials such as a high potential, intermediate potential, and low potential and for representing a half cycle of an AC output phase voltage by outputting the high potential and low potential alternately via the intermediate potential, wherein said apparatus has a means for changing a sum of output periods of said intermediate potential so that an output frequency of said power converter so that a sum of a width of a high potential pulse included in the AC output phase voltage and a width of a low potential pulse which is neighboring the high potential pulse via the intermediate potential larger than a sum of output periods of the intermediate potential which is neighboring the high potential pulse.

10. An apparatus for controlling a power converter comprising a modulation means for converting a direct current to an AC phase voltage having at least three potentials such as a high potential, intermediate potential, and low potential and for representing a half cycle of an AC output phase voltage by outputting the high potential and low potential alternately via the intermediate potential, wherein said apparatus has a means for setting an output period of the intermediate potential which is neighboring a high potential pulse included in the AC output phase voltage to a period which is determined by a minimum ON and OFF time of switching elements constituting the power converter when an output frequency of said power converter is less than a predetermined value and for making the output period of said intermediate potential equal to a sum of a high potential pulse width and a low potential pulse width which is neighboring the high potential pulse via the intermediate potential.

11. An apparatus for controlling a power converter comprising a modulation means for converting a direct current to an AC phase voltage having at least three potentials such as a high potential, intermediate potential, and low potential and for representing an half cycle of an AC output phase voltage by outputting the high potential and low potential alternately via the intermediate potential, wherein said apparatus has a means for setting an intermediate potential output period of an output voltage smaller than $\frac{1}{4}F_c$ ($F_c$: carrier frequency) and larger than a period which is determined by an minimum ON and OFF time of switching elements constituting the power converter.

12. An apparatus for controlling a power converter comprising a modulation means for converting a direct current to an AC phase voltage having at least three potentials such as a high potential, intermediate potential, and low potential and for representing an half cycle of an AC output phase voltage by outputting the high potential and low potential alternately via the intermediate potential, wherein said apparatus has a means for setting an intermediate potential output period of an output voltage smaller than $\frac{1}{4}F_c$ ($F_c$: carrier frequency) and larger than a period which is determined by an minimum ON and OFF time of switching elements constituting the power converter and a means for changing the intermediate potential output period.

13. An apparatus for controlling a power converter comprising a modulation means for converting a direct current to an AC phase voltage having at least three potentials such as a high potential, intermediate potential, and low potential and for representing a half cycle of an AC output phase voltage by outputting the high potential and low potential alternately via the intermediate potential, wherein said apparatus has a means for setting an intermediate potential output period of an output voltage smaller than $\frac{1}{4}1045$ Fc (Fc: carrier frequency) and larger than a period which is determined by a minimum ON and OFF time of switching elements constituting the power converter and a means for changing the intermediate potential output period according to an output frequency of said power converter.

14. An apparatus for controlling a power converter comprising a modulation means for converting a direct current to an AC phase voltage having at least three potentials such as a high potential, intermediate potential, and low potential and for representing a half cycle of an AC output phase voltage by outputting the high potential and low potential alternately via the intermediate potential, wherein said apparatus has a means for setting an intermediate potential output period of an output voltage to a period which is determined by a minimum ON and OFF time of switching elements constituting the power converter when an output frequency of the power converter is less than a predetermined value and for setting it to $\frac{1}{4}Fc$ (Fc: carrier frequency) when the output frequency of the power converter is more than the predetermined value.

15. An apparatus for controlling a power converter comprising a power converter for converting a direct current to an AC phase voltage having at least three potentials such as a high potential, intermediate potential, and low potential, a fundamental wave voltage command generating means for generating a fundamental wave command of an alternating current which is outputted from the power converter, an amplitude command distributing means for creating a positive amplitude command and a negative amplitude command from the fundamental wave voltage command, giving a bias which is larger than 0.25 and smaller than 0.5 against a carrier amplitude to the amplitude commands, and outputting the positive amplitude command and negative amplitude command, and a pulse generating and distributing means for comparing each of the amplitude commands and a carrier and creating a gate signal to be supplied to said power converter.

16. An apparatus for controlling a power converter according to claim 15, wherein the bias which is given to said amplitude commands is a fixed value.

17. An apparatus for controlling a power converter according to claim 15, wherein the bias which is given to said amplitude commands varies with a output frequency of the power converter.

18. An apparatus for controlling a power converter comprising a power converter for converting a direct current to an AC phase voltage having at least three potentials such as a high potential, intermediate potential, and low potential, a fundamental wave voltage command generating means for generating a fundamental wave command of an alternating current which is outputted from the power converter, an amplitude command distributing means for creating a positive amplitude command and a negative amplitude command from the fundamental wave voltage command, giving a bias which is larger than 0.5 and smaller by a value which is determined by a minimum ON and OFF time of switching elements constituting the power converter against a carrier amplitude when an output frequency of the power converter is less than a predetermined value or a bias of 0.25 against the carrier amplitude when the output frequency of the power converter is less than the predetermined value to the amplitude commands, and outputting the positive amplitude command and negative amplitude command, and a pulse generating and distributing means for comparing each of the amplitude commands and a carrier and creating a gate signal to be supplied to said power converter.

19. An apparatus for controlling a power converter comprising a modulation means for converting a direct current to an AC phase voltage having at least three potentials such as a high potential, intermediate potential, and low potential and for representing a half cycle of an AC output phase voltage by outputting the high potential and low potential alternately via the intermediate potential, wherein a current capacity of elements constituting said converter is less than 2.49 times of an element current when a maximum voltage at a time of modulation is outputted.

20. An apparatus for controlling a power converter comprising a modulation means for representing a half cycle of an AC output phase voltage by outputting the high potential and low potential alternately via the intermediate potential, a power converter for converting a direct current to an AC phase voltage having at least three potentials such as a high potential, intermediate potential, and low potential, and an AC motor for driving an electric motor vehicle to which power is supplied by the power converter, wherein said apparatus has a means for allowing a fundamental wave at an output frequency of said power converter to continue an operation at several Hz at most.

21. An apparatus for controlling an electric motor vehicle comprising a power converter having a plurality of structures, each of which has a capacitor which is connected in series so as to divide a DC voltage, four series-connected switching means which are connected to the capacitor in parallel, a series diode which is connected to two inside elements in parallel, and a joint of the series diode and a joint of said capacitor which are connected to each other, a driving AC motor connected to the power converter, and a control means for representing a half cycle of an AC output phase voltage of said power converter by outputting a high potential and low potential alternately via an intermediate potential, wherein said apparatus has a means for adjusting an unbalance degree between a mean current of an inside switching means of said four series-connected switching means and a mean current of an outside switching means, which is set to a value when a difference between the mean current of the inside switching means and the mean current of the outside switching means is divided by the mean current of the inside switching means, within a range of $0 \geq$ unbalance degree $\geq 0.52$ according to an operation mode of the electric motor vehicle.

* * * * *